United States Patent [19]
McCurry

[11] 3,714,532
[45] Jan. 30, 1973

[54] BRUSHLESS DIRECT CURRENT MOTOR INCLUDING RESONANT CIRCUITS AND DIFFERENTIAL AMPLIFIER FOR CONTROLLING COMMUTATION

[75] Inventor: Morris H. McCurry, Dayton, Ohio
[73] Assignee: TRW Inc., Cleveland, Ohio
[22] Filed: Nov. 6, 1970
[21] Appl. No.: 87,502

[52] U.S. Cl. ................... 318/254, 318/138, 318/439
[51] Int. Cl. .............................................. H02k 29/00
[58] Field of Search ....... 318/254, 696, 685, 138, 439

[56] References Cited
UNITED STATES PATENTS

| | | | |
|---|---|---|---|
| 3,594,624 | 7/1971 | Lueder | 318/254 |
| 3,619,746 | 11/1971 | Thornton | 318/254 |
| 3,242,405 | 3/1966 | Ikegami | 318/254 X |
| 3,153,185 | 10/1964 | Hummel | 318/254 |
| 3,339,133 | 8/1967 | Favre | 318/138 |
| 3,305,713 | 2/1967 | Ikegami | 318/138 |
| 3,383,574 | 5/1968 | Manteuffel | 318/254 X |

Primary Examiner—G. R. Simmons
Attorney—Marechal, Biebel, French and Bugg

[57] ABSTRACT

In a brushless direct current motor, the commutation of current through the motor field windings is controlled by the voltage level across a plurality of sensing inductors mounted to detect the position of a metallic segment which rotates with the motor armature. The sensing inductors are supplied with a high frequency current from a fixed frequency oscillator, and changes in the resonance frequency of the inductors due to the proximity of the metallic segment causes the voltage across the inductors to change sharply. The voltage outputs from complementary inductors are applied to a differential amplifier, and a change in voltage is sensed to control the current through the field windings. By comparing the outputs from complementary pairs of inductors simultaneously, the output from the differential amplifier is made substantially independent of the frequency and magnitude of the high frequency excitation current. Also, the sensing inductors are kept small and complementary coils are matched to minimize angular errors.

6 Claims, 7 Drawing Figures

INVENTOR
MORRIS H. McCURRY

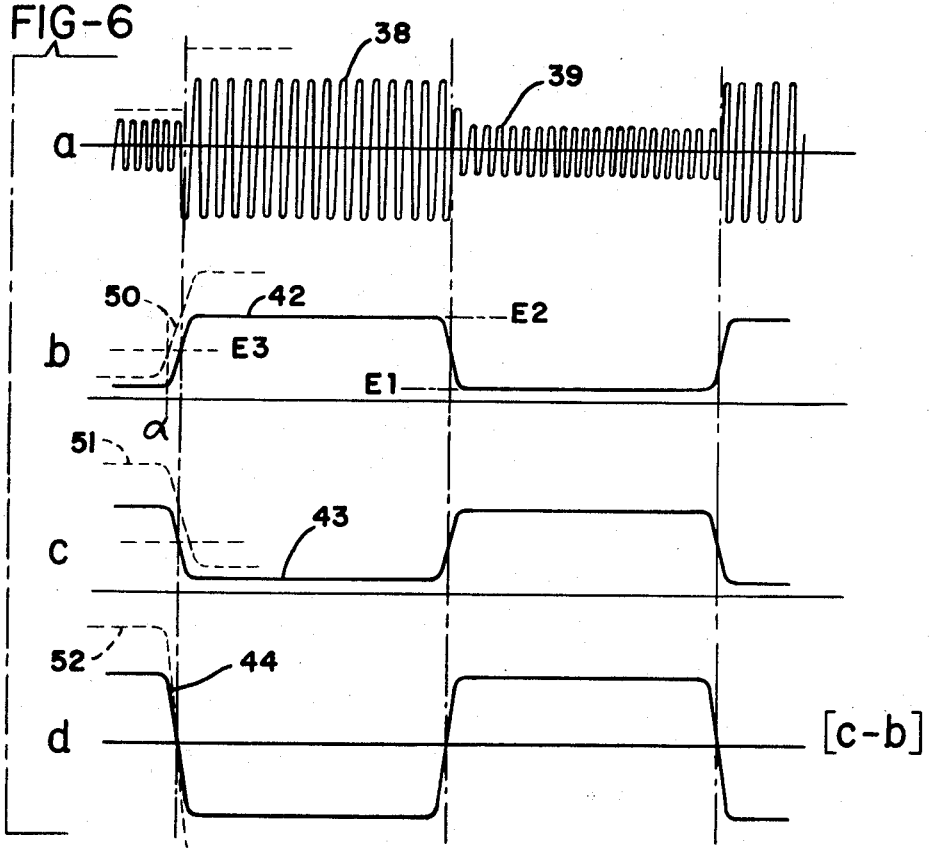
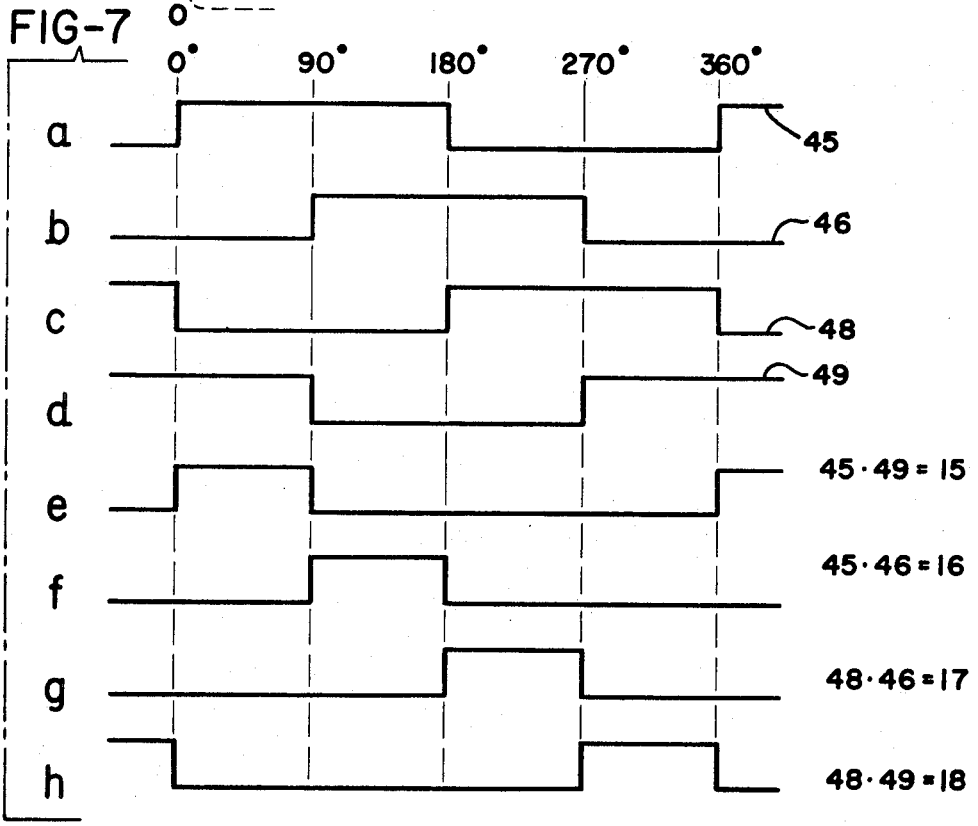

BRUSHLESS DIRECT CURRENT MOTOR INCLUDING RESONANT CIRCUITS AND DIFFERENTIAL AMPLIFIER FOR CONTROLLING COMMUTATION

BACKGROUND OF THE INVENTION

This invention relates to a brushless direct current motor of the type including a permanent magnet armature, at least a pair of angularly spaced field windings surrounding the armature, and means for controlling the commutation of current through the field windings in such a way that a rotating magnetic field is created to induce torque into the armature and to cause it to rotate. Various techniques have been employed to sense the angular position of the armature with respect to the field windings, these techniques employing the use of inductors, photoelectric devices, and magnetic sensors.

Good performance of the motor depends on the switching of the current through the field winding at the proper angle of rotation of the armature with the theoretical optimum torque occurring when the magnetic field in the field winding to lead the magnetic field of the armature by an average of 90°. Accordingly, the angles at which the current is switched in the field winding coils are important since changes in these angles due to aging, temperature effects on the components, or manufacturing errors can reduce the efficiency of the motor.

SUMMARY OF THE INVENTION

In the invention, an improved brushless direct current motor includes circuitry which minimizes the angular error in controlling the current through the field windings. In the present invention, sensing inductors are used to detect the position of a metallic segment mounted to rotate with the armature. The inductors are supplied with high frequency current from a fixed frequency oscillator and are tuned to resonate at the frequency of the oscillator. Tuning of the inductors may be accomplished with the metallic segment in proximity to the inductors, or absent its proximity. When the metallic segment rotates into proximity with the inductor, the resonance frequency of the inductor changes and therefore the voltage developed across the inductor decreases or increases, depending on how it is tuned. The voltage developed across complementary pairs of inductors is applied to a differential amplifier which produces an output change when the differences in the voltage output between the inductors crosses zero. In this way, the output of the amplifier is a logic level substantially independent of the magnitude and frequency of the voltage from the high frequency oscillator.

In one embodiment of the invention representing a two-pole motor, the metallic segment is a 180° half circle and therefore the complementary pairs of inductors are spaced 180° apart. In another embodiment of the invention representing a four-pole motor, the metallic segment is formed from two 90° segments, and in this case, the complementary inductors are spaced 90° apart. Of course, this invention is adaptable to a motor having any number of poles by proper shaping of the metallic segment and proper spacing of inductors. The inductors are kept as small as possible compared to the diameter of the metallic segment and the output voltages of complementary pairs are well matched so that any changes in the frequency or magnitude of the oscillator output or any changes in the spacing between the segments and the inductors will affect both inductors of a pair in the same way.

Angular errors in the position of the armature at the time the current through the field coils is switched is thereby minimized and the motor made to perform in the optimum manner.

Accordingly, it is an object of this invention to provide an improved brushless direct current motor of the type described wherein a fixed frequency oscillator supplies energy to complementary pairs of inductors mounted to detect the position of a metallic segment which rotates with the motor armature and wherein the voltage across the pair of inductors is applied to a differential amplifier thereby to minimize errors in the sensing of the angular position of the armature; to provide an improved motor of the type described wherein the inductors are tuned to resonate at the frequency of the oscillator and wherein the coils are detuned periodically as the metallic segment rotates thus changing the voltage across the coil; and to provide an improved brushless direct current motor of the type described wherein the outputs from complementary inductors are subtracted to give a zero crossing voltage which is substantially independent of the magnitude and frequency of the high frequency oscillator output.

Other objects and advantages of the invention will be apparent from the following description, the accompanying drawings and the appended claims.

BRIEF DESCRIPTION OF THE DRAWINGS

FIGS. 6a–6d are wave forms showing the voltages at selected portions of the circuit of FIG. 5;

FIGS. 7a through h are wave forms taken at other selected portions of the circuit of FIG. 5.

DESCRIPTION OF THE PREFERRED EMBODIMENT

Figure 1:
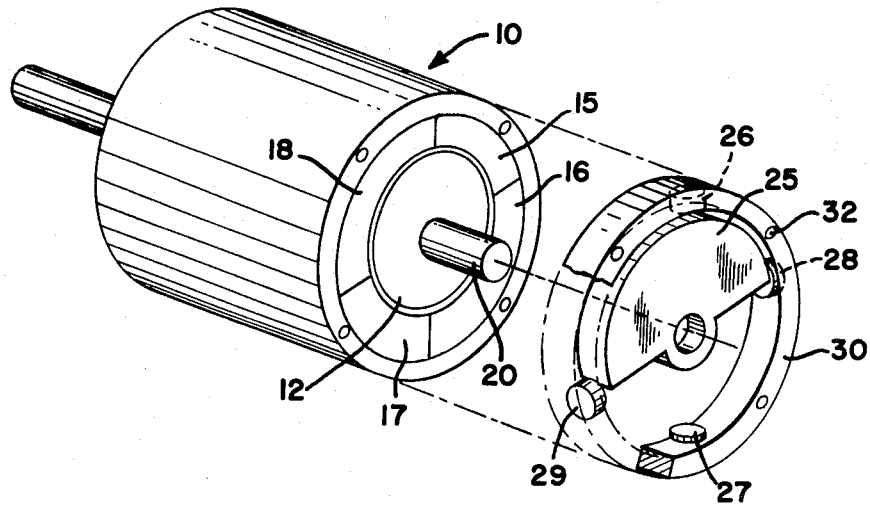
FIG. 1 is a perspective view of a brushless direct current motor showing a permanent magnet armature, field windings, a metallic segment mounted to rotate with the armature, and two pairs of radially positioned complementary inductors to detect the position of the metallic segment.

Referring now to the drawings which show the preferred embodiments of the invention, a brushless direct current motor 10 is shown in FIG. 1 and includes a permanent magnet armature 12 and a plurality of angularly spaced field windings 15, 16, 17 and 18 surrounding the armature. The permanent magnet armature 12 is carried on a shaft 20 which is supported within bearings (not shown). Also carried on the shaft 20 is a position indicating means or a metallic segment 25.

Figure 4:
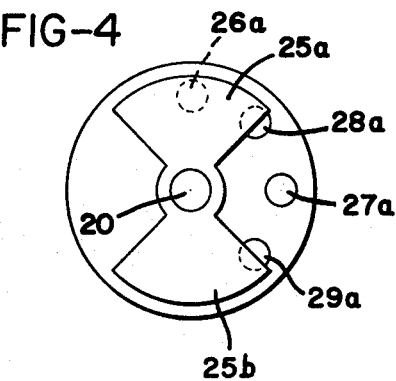
FIG. 4 is a view showing a metallic segment formed into two 90° segments and two pairs of axially arranged coils to detect the position of that segment.

Two pairs of inductors 26–27 and 28–29 are mounted in a supporting ring 30 and sense the angular position of the rotating metallic segment 25. The supporting ring 30 may be mounted directly to the motor case 31 by small screws 32. As shown in FIG. 1, the sensing inductors are of small diameter as compared to the segment 25 and are radially positioned in a plane which includes the segment. An alternative construction is shown in FIGS. 2 and 4 where inductors 26a–29a may be positioned axially adjacent the outer circumferential extent of the segment 25.

Figure 2:
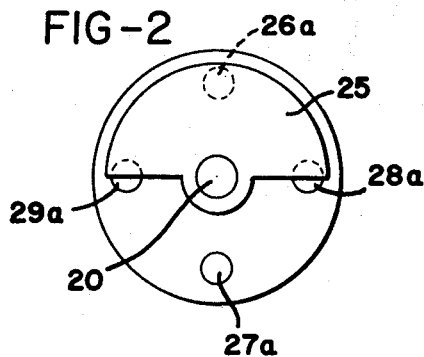
FIG. 2 is an end view of the motor showing a 180° metallic segment and two pairs of axially oriented inductors.
Figure 3:
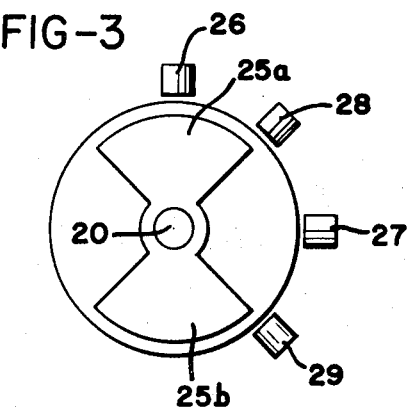
FIG. 3 is a view showing a metallic segment formed into two 90° segments and two pairs of radially positioned inductors.

The segment 25 shown in FIGS. 1 and 2 is a 180° half circle and the position sensing inductors are spaced at 90° intervals with complementary pairs of inductors being spaced 180° apart. It is also contemplated that the position indicating means may be formed from two 90° segments 25a and 25b, as shown in FIGS. 3 and 4, in which case the position sensing inductors are positioned at 45° intervals, or with complementary pairs being spaced 90° apart. Of course, this invention may be used with motors having any number of poles with the proper placement of the sensing inductors and shape of the rotating segment. The inductors are electrically related in pairs with the inductors in a pair being so positioned that the leading and trailing edges of the rotating segment coincide with the inductors within a pair. In other words, the angular spacing of complementary pairs of inductors is the same as the angular extent of the position indicating segment.

Figure 5:
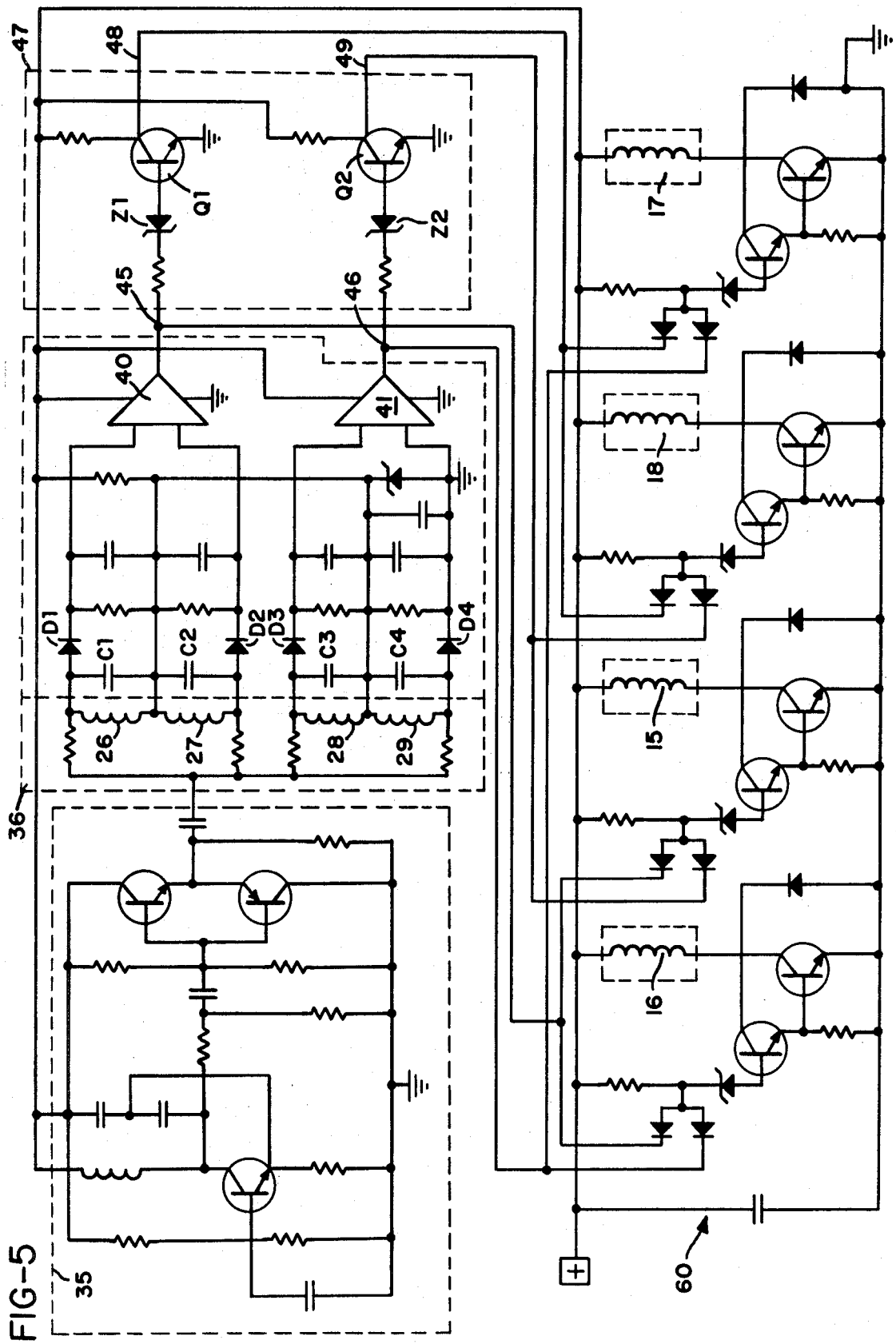
FIG. 5 is an electrical schematic diagram showing the segment sensing inductors, a typical high frequency oscillator supplying energy to the inductors, a dual differential amplifier connected to the inductors, and a switching circuit for controlling the current through the field windings of the motor.

A circuit diagram for a preferred embodiment of the invention is shown in FIG. 5 and includes a fixed frequency oscillator 35 supplying energy to the inductor portion of the circuit 36 which includes inductors 26–29. Each inductor is tuned by means of capacitor C1–C4 to resonate at the oscillator frequency when the rotating segment 25 is not in position with respect to that inductor. When the segment thereafter rotates into position near an inductor, the impedance of the inductor is changed and therefore its resonant frequency changes.

The voltage appearing across an inductor therefore depends on whether the rotating segment is or is not positioned in proximity to the inductor. In FIG. 6a, the high frequency voltage across an inductor in resonance is shown by the wave form 38 while the voltage across the inductor out of resonance due to the presence of the rotating segment is shown by the wave form 39.

The voltage appearing across one pair of inductors 26 and 27 is rectified by diodes D1 and D2 and applied to a differential amplifier 40. The voltage appearing across the other pair of inductors 28 and 29 is rectified by diodes D3 and D4 and applied to the input terminals of differential amplifier 41. In the embodiment shown, both differential amplifiers are Motorola type MC1709G operational amplifiers which are open loop connected and used as direct current comparator circuits. Of course, other types of differential amplifiers may be used, as is well known to those skilled in the art.

For purposes of illustration, the rectified voltage across inductor 26 is shown by the wave form 42 in FIG. 6b while the rectified voltage across the other inductor 27 of the pair is shown by the wave form 43 in FIG. 6c.

The minimum voltage E1 represents the rectified portion of the wave form 39 of FIG. 6a while the maximum voltage E2 represents the rectified portion of the wave form 38 of FIG. 6a. It may be observed in FIGS. 6b and 6c that the transition from voltage level E1 to voltage level E2 takes a finite amount of time. This is due to the time required for the edge of the rotating segment to cover completely the entire diameter of the position sensing inductor. For this reason, the diameter of the inductors is kept as small as possible in order to make this slope as steep as possible.

The wave form 44 shown in FIG. 6d represents the difference between the wave forms shown in FIGS. 6c and 6b, or in other words the difference in the direct current voltage level across coils 26 and 27. Since these coils are designed to give similar outputs, and since the outputs are complementary, the voltage across the differential amplifier 40 will cross zero at angle 0°. The differential amplifier 40 is designed to produce an output change at terminal 45 when the input voltage crosses zero, as represented by the wave form shown in FIG. 7a. Similarly, differential amplifier 41 produces an output change at terminal 46 illustrated by the wave form in FIG. 7b. Both outputs 45 and 46 are applied to an inverter circuit 47. Output 45 is applied through Zener diode Z1 to transistor Q1, and its output on line 48 is shown in FIG. 7c. Output 46 is applied through Zener diode Z2 to transistor Q2, and its output on line 49 is illustrated by the wave form in FIG. 7d. Zener diodes Z1 and Z2 are included since the output on terminals 45 and 46 is above zero potential at all times.

In prior art devices, inductors have been used to sense the position indicating segment which rotates with the motor armature. As may be seen in FIGS. 6b and 6c, there is a finite amount of time required to change the voltage level across the inductor, and therefore the exact position of the armature cannot be determined precisely. Also, if voltage level alone is used to determine the switching times for the current through the field windings, then the angular position of the armature at the time the current through the field winding is switched will vary depending upon the magnitude of the voltage across the inductor. This is illustrated by the dotted line 50 in FIG. 6b. Assuming that the current through the field winding is switched when the voltage level reaches E3, then the current will be switched at 0° when the voltage across the inductor is represented by wave form 42. However, the current will be switched through the field windings at some angle α prior to the 0° when the voltage across the inductor is represented by the wave form 50.

In the present invention, since complementary pairs of inductors are compared, one against the other, no angular error in the switching of the current through the inductors will be created in the event that the magnitude of the voltage across the inductors changes since these changes will affect both inductors simultaneously. In other words, when the dotted wave forms 50 and 51 shown in FIGS. 6b and 6c are subtracted from each other in the comparator circuit, the dotted wave form 52 shown in FIG. 6d will result, and it may be seen that this wave form crosses zero precisely at 0°.

Referring again to FIG. 5, the voltage output from the comparator circuits 40 and 41, and the inverter circuits are applied to a switching network, shown generally at 60. By using AND circuits, the current through field windings 15–18 can be made to follow the wave forms shown in FIGS. 7e through 7h. As a result, a rotating magnetic field is created which has essentially four discrete positions, each leading the armature magnetic field by an average of 90°, which is theoretically the optimum torque angle.

It is also within the scope of this invention to provide a switching circuit wherein only two field windings are used with one winding being energized at a time and with the current flowing through that winding in both the forward and reverse directions.

Thus, using the techniques of this invention, the angle at which the magnetic field through the field windings is switched may be controlled precisely and independently of the magnitude of the current through the position sensing inductors and the spacing between the inductors and the position indicating means.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a brushless direct current motor including
a permanent magnet rotor,
angularly spaced field windings surrounding said rotor,
position indicating means mounted to rotate with said rotor,
at least a pair of inductors mounted to sense the angular position of said position indicating means, and
circuit means responsive to said sensing inductors for controlling the current flow through said field windings in such a way to cause said rotor to rotate,
the improvement comprising
a continuously running oscillator for supplying fixed high frequency energy to said sensing inductors,
means associated with each inductor to form a resonant circuit tuned to resonate at the frequency of said oscillator, said resonant circuits being alternately tuned and detuned by the rotation of said position indicating means,
means for sensing the voltage across one of the reactive elements of said resonant circuits to produce an output for controlling the current through said field winding at specified angular positions of said rotor to cause torque and produce rotation, said sensing means including a differential amplifier comparing the difference in the voltage developed across a complementary pair of said resonant circuits, said amplifier providing a change in output when the difference across said resonant circuits crosses through zero potential thereby to control the current through said field windings at angular positions of said rotor.

2. The motor of claim 1 further including capacitors in parallel with each said inductor and tuned to resonate with said inductors at the frequency of said oscillator, said parallel tuned circuit detuned by the proximity of said position indicating means.

3. The motor of claim 1 further including means for rectifying the voltage developed across said inductors and wherein said differential amplifier is a direct current amplifier.

4. The motor of claim 1 wherein said complementary pair of sensing inductors is matched in size and inductance.

5. The motor of claim 1 wherein said position indicating means includes a semicircular segment which rotates with the motor shaft and wherein two pairs of 180° spaced apart sensing inductors are mounted to sense the angular position of said position indicating means.

6. The motor of claim 1 wherein said position indicating means includes two opposed segments mounted for rotation with said rotor, each segment having an angular extent of approximately 90° and wherein two pairs of sensing inductors sense the position of said segments, each pair having an angular spacing equal to that of said segments.

* * * * *